US010451761B2

(12) United States Patent
Dotson et al.

(10) Patent No.: US 10,451,761 B2
(45) Date of Patent: Oct. 22, 2019

(54) ULTRASOUND COLOR FLOW IMAGING FOR OIL FIELD APPLICATIONS

(71) Applicant: Halliburton Energy Services, Inc., Houston, TX (US)

(72) Inventors: Adam R. Dotson, Houston, TX (US); Dale E. Jamison, Humble, TX (US); Cato Russell McDaniel, Montgomery, TX (US); Xiangnan Ye, Cypress, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 71 days.

(21) Appl. No.: 15/546,578

(22) PCT Filed: Feb. 27, 2015

(86) PCT No.: PCT/US2015/018135
§ 371 (c)(1),
(2) Date: Jul. 26, 2017

(87) PCT Pub. No.: WO2016/137511
PCT Pub. Date: Sep. 1, 2016

(65) Prior Publication Data
US 2018/0024264 A1    Jan. 25, 2018

(51) Int. Cl.
*G01V 1/46* (2006.01)
*G01F 1/66* (2006.01)
(Continued)

(52) U.S. Cl.
CPC ............... *G01V 1/46* (2013.01); *E21B 21/08* (2013.01); *F04B 43/02* (2013.01); *G01F 1/662* (2013.01); *G01F 1/663* (2013.01); *E21B 43/26* (2013.01)

(58) Field of Classification Search
CPC .............. G01V 1/46; G01F 1/66; F04B 43/02
See application file for complete search history.

(56) References Cited

U.S. PATENT DOCUMENTS 5,130,950 A *  7/1992  Orban ................... B06B 1/0681
                                                    181/102
6,067,861 A     5/2000  Shekarriz et al.
(Continued)

OTHER PUBLICATIONS

International Search Report and Written Opinion for PCT/US15118135 dated Sep. 1, 2016.
(Continued)

*Primary Examiner* — Jewel V Dowtin
(74) *Attorney, Agent, or Firm* — Tenley Krueger; C. Tumey Law Group PLLC (57) ABSTRACT

A system and method for rheology measurements. The system may comprise a conduit; an ultrasound transmitter positioned to direct ultrasound pulses into the conduit; an ultrasound receiver positioned to receive sound waves from the conduit; a pump fluidically coupled to the conduit; and a heat exchanger fluidically coupled to the conduit. The method may comprise drawing a sample of a treatment fluid into the rheology measurement system; pressuring the sample of the treatment fluid; adjusting temperature of the treatment fluid; directing ultrasound pulses into the treatment fluid while the treatment fluid is flowing through the rheology measurement system; measuring sound waves reflected by the treatment fluid; and determining a velocity profile of the treatment fluid based at least on the measured sound waves.

19 Claims, 6 Drawing Sheets

(51) Int. Cl.
*F04B 43/02* (2006.01)
*E21B 21/08* (2006.01)
*E21B 43/26* (2006.01)

(56) References Cited

U.S. PATENT DOCUMENTS

| | | | | |
|---|---|---|---|---|
| 6,162,176 | A | 12/2000 | Washburn et al. | |
| 6,344,722 | B1* | 2/2002 | Abel | F04B 49/065 |
| | | | | 318/430 |
| 7,418,865 | B2* | 9/2008 | Griffiths | E21B 47/082 |
| | | | | 181/102 |
| 7,926,562 | B2* | 4/2011 | Poitzsch | E21B 43/26 |
| | | | | 166/250.01 |
| 8,220,545 | B2* | 7/2012 | Storm, Jr. | E21B 47/011 |
| | | | | 166/302 |
| 2006/0034707 | A1* | 2/2006 | Thomas | F04B 17/03 |
| | | | | 417/410.1 |
| 2006/0034711 | A1* | 2/2006 | Bergner | F04B 35/045 |
| | | | | 417/417 |
| 2006/0101916 | A1 | 5/2006 | Griffiths et al. | |
| 2006/0131014 | A1 | 6/2006 | Huang et al. | |
| 2011/0061477 | A1* | 3/2011 | Fitz | G01N 17/002 |
| | | | | 73/865.6 |
| 2012/0103097 | A1* | 5/2012 | Lopez Jauregui | G01N 29/2412 |
| | | | | 73/643 |
| 2013/0080063 | A1* | 3/2013 | Pillai | E21B 47/18 |
| | | | | 702/9 |
| 2013/0146357 | A1 | 6/2013 | Lovorn | |
| 2013/0192360 | A1 | 8/2013 | Jamison et al. | |
| 2014/0219057 | A1 | 8/2014 | Dallas et al. | |
| 2018/0002995 | A1* | 1/2018 | Dotson | E21B 21/08 |

OTHER PUBLICATIONS

"Industrial application of ultrasound based in-line rheometry" by Ouriev et al. dated Oct. 2004.

* cited by examiner

ULTRASOUND COLOR FLOW IMAGING FOR OIL FIELD APPLICATIONS

BACKGROUND

The present disclosure relates to the rheology measurement of a fluid using ultrasound color flow imaging. More particularly, systems and methods may be provided that use ultrasound color flow imaging for monitoring fluid rheology in oilfield applications.

Rheology is the science of flow and deformation of matter and describes the interrelation between force, deformation and time. In simple flows, viscosity is a single parameter that links the rate of shear and the shear stress in the flow field. In industrial fluids, which are complex fluids, the viscosity cannot be represented in terms of a single parameter and becomes a function of the flow field. In a solid-liquid slurry, the local fluid viscosity not only depends on the local concentration of the solids but also on the local rate of shear and its gradient. Often, the solids being transported in the pipeline migrate away from pipe walls and into the core of the fluid flow within the pipe. As a result, rheology measurements of the fluid near the wall will yield erroneous results relative to the total flow cross section.

Rheological characterization of solid-liquid dispersions may commonly be performed using off-line measurement devices. For example, shear rheometers and extensional rheometers may be used to determine the rheological characterization of a solid-liquid dispersion. Using off-line measurement devices may have disadvantages to determining rheological characterization. A disadvantage may be that once a sample is withdrawn from a process stream, the rheological properties may begin to change. Often, the fluids to be measured may have rheologies that intimately depend on the flow field. This dependence is especially true for colloidal suspensions in which size and fractal dimensions of the clusters or aggregates depend strongly on the environment under which they exist. Many of these fluids exhibit shear-dependent viscosity, in the form of shear thinning or shear-thickening behavior, requiring determination of their viscosity at various shear-rates which may correspond to the range of shear rates observed in the flow field. Off-line measurements may hardly reproduce the same conditions which may exist in a real flow field such as shear induced migration of solid particles. This may make it difficult to obtain representative sample for off-line measurements of material in a pipeline that may not be homogeneous.

An alternative to off-line measurements may be the use of in-line systems and/or auxiliary systems which may monitor the rheology of a fluid passing through a pipe. Monitoring the rheology, in real-time, of a fluid within an in-line system and/or an auxiliary system may overcome the disadvantages found in off-line rheology measurements.

BRIEF DESCRIPTION OF THE DRAWINGS

The features and advantages of certain embodiments will be more readily appreciated when considered in conjunction with the accompanying figures. The figures are not to be construed as limiting any of the preferred embodiments.

DETAILED DESCRIPTION

The present disclosure relates to the rheology measurement of a fluid using ultrasound color flow imaging. As disclosed, a system and method using ultrasound may be used to provide a more accurate rheology profile. A rheology profile describes the flow of matter through an area under an applied force. Measurements of a fluids rheology may provide the strain rate and the different material and/or fluids within the measured fluid. Rheology measurements of a fluid may be provided by measuring the velocity profile within a flow filed. The velocity profile may be measured with an ultrasound device. An ultrasound device may take measurements of velocity by producing ultrasound pulses which may create echoes as the ultrasound pulses reflect off fluid moving within a confined area. The echoes may be recorded and used to create a velocity profile.

Rheology of a fluid is conventionally determined by removing fluid from a source and placing it within a rheometer, which may be referred to as off-line measurements. Off-line measurements, as discussed above, may have disadvantages when measuring the rheology of a fluid. Overcoming these disadvantages may begin with measuring the rheology of a fluid within an active system. As disclosed, a rheology measurement system within an active system may overcome the many disadvantages of an off-line measurement system. In embodiments, an active system may be defined as an in-line system and/or in an auxiliary system. An auxiliary system, also called a pike, may attach to the in-line system. Active system measurements of a fluids rheology may be performed with an ultrasound imaging device. An ultrasound imaging device may comprise a transducer that converts electrical current into sound waves, which are sent into the fluid. Sound waves bounce off particles in the fluid and are reflected back to the transducer, which converts the waves into electrical signals. A computer converts the pattern of electrical signals into an array of velocities, or even an image, which is displayed on a monitor and/or recorded. Producing a series of ultrasound pulses, an ultrasound device may determine the velocity of a fluid within a flow field based on the echoed signal. A color flow display and/or a Doppler sonogram may be used to illustrate the velocity within the flow field. A Doppler ultrasound may measure the movement of echoes through an ultrasound signal as a phase change, which may be used for flow velocity calculation, and thus viscosity calculation.

A system for rheology measurements may be provided. The system may comprise a conduit; an ultrasound transmitter positioned to direct ultrasound pulses into the conduit; an ultrasound receiver positioned to receive sound waves from the conduit; a pump fluidically coupled to the conduit, and a heat exchanger fluidically coupled to the conduit. The ultrasound transmitter and the ultrasound receiver may be a single element. The ultrasound transmitter and the ultrasound receiver may be disposed on opposite sides of the conduit. The ultrasound transmitter and the ultrasound receiver may be disposed on the same side of the conduit.

The pump may be a syringe pumps, peristaltic pumps, progressive cavity pumps, and/or pulse dampened diaphragm pumps. The heat exchanger may be peltier devices, resistance band heaters, resistance cartridge heaters, and/or resistance heat trace lines. The system may further comprise a flow straightening device disposed in the conduit. The flow straightening device may comprise a plurality of vanes disposed in the conduit.

A system for rheology measurements may be provided. The system may comprise a conduit; an ultrasound transmitter positioned to direct sound waves into the conduit; an ultrasound receiver on an opposite side of the conduit from the ultrasound transmitter and positioned to receive sound waves from the conduit; a pump fluidically coupled to the conduit; a heat exchanger fluidicially coupled to the conduit; and vanes disposed in the conduit. The heat exchanger may be peltier devices, resistance band heaters, resistance cartridge heaters, and/or resistance heat trace lines.

A method of operating a rheology measurement system may be provided. They method may comprise drawing a sample of a treatment fluid into the rheology measurement system; pressuring the sample of the treatment fluid; adjusting temperature of the treatment fluid; directing ultrasound pulses into the treatment fluid while the treatment fluid is flowing through the rheology measurement system; measuring sound waves reflected by the treatment fluid; and determining a velocity profile of the treatment fluid based at least on the measured sound waves. The treatment fluid may comprise a solids-containing fluid. The step of adjusting the temperature may comprise heating the treatment fluid. The step of adjusting the temperature may comprise cooling the treatment fluid. The method may further comprise straightening flow of the treatment fluid in the rheology measurement system. The straightening flow may comprise passing the treatment fluid through a plurality of vanes positioned in a conduit in the rheology measurement system. The method may further comprise generating a color flow display of fluid flow in the rheology measurement system. The method may further comprise generating a Doppler sonogram of fluid flow in the rheology measurement system. The method may further comprise determining viscosity of the treatment fluid based at least on the determined velocity profile. The method may further comprise adjusting concentration of one or more components of the treatment fluid based at least on the velocity profile and/or rheology of the treatment fluid.

Figure 1:
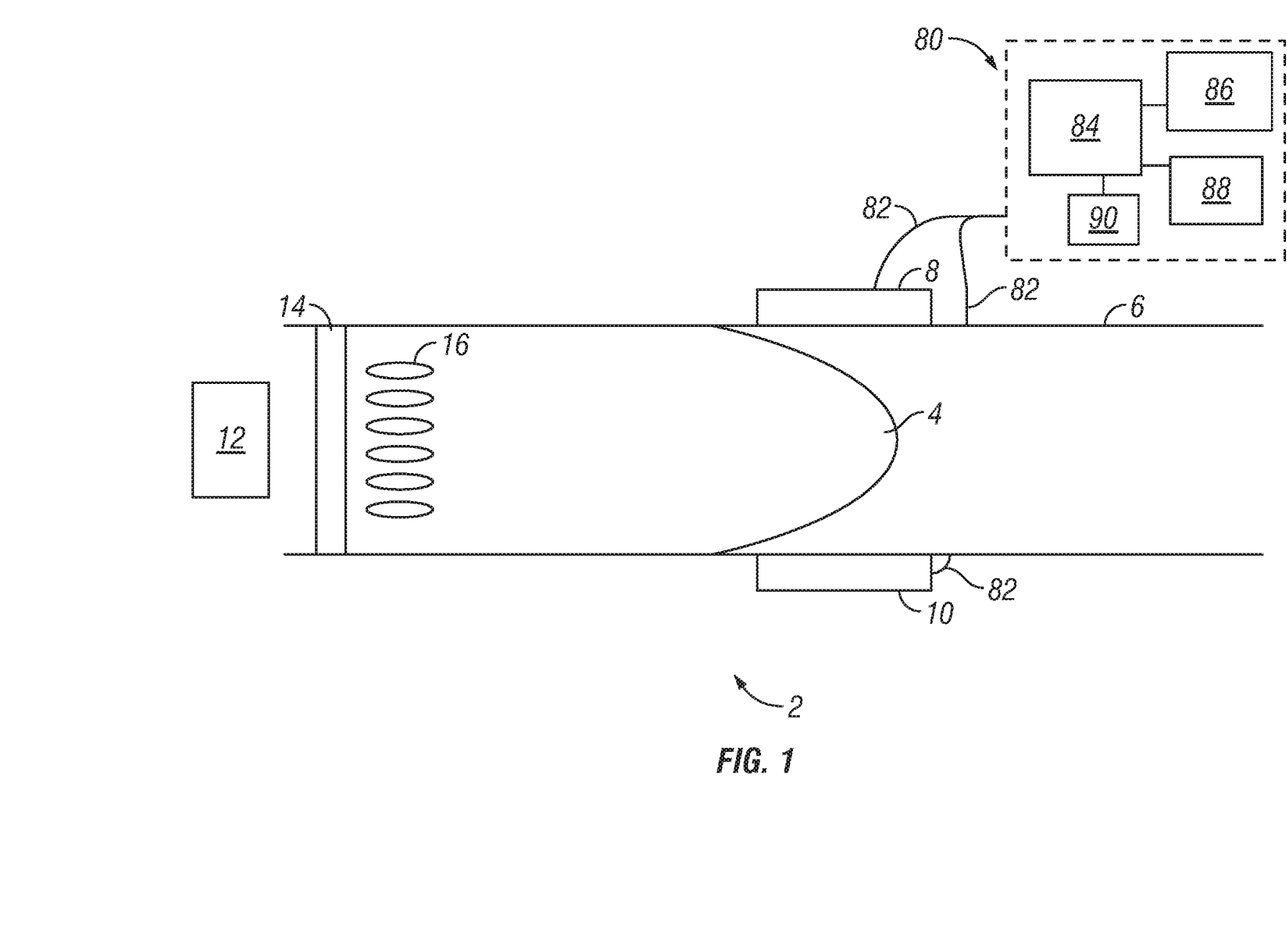
FIG. 1 is a schematic illustration of an example rheology measurement system.
Figure 2:
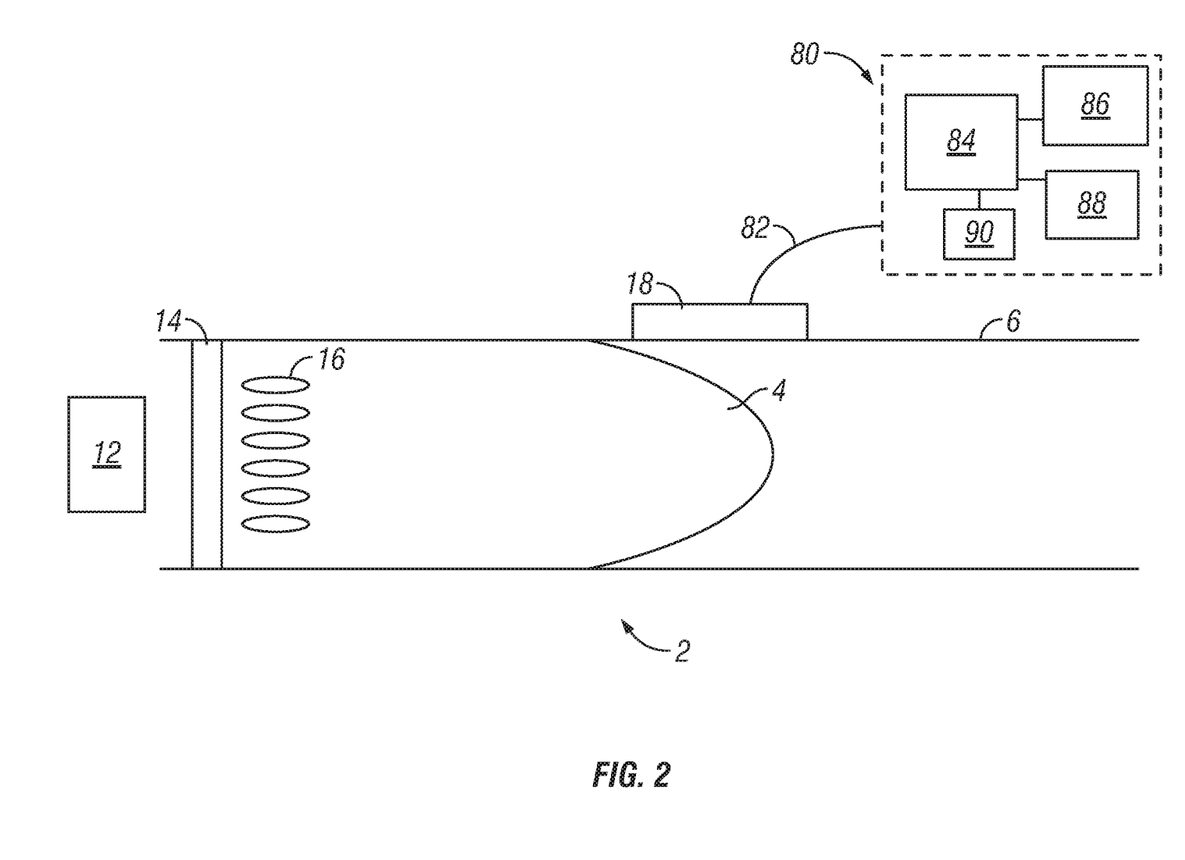
FIG. 2 is a schematic illustration of an example rheology measurement system with a transmitter and receiver within a single element.
Figure 3:
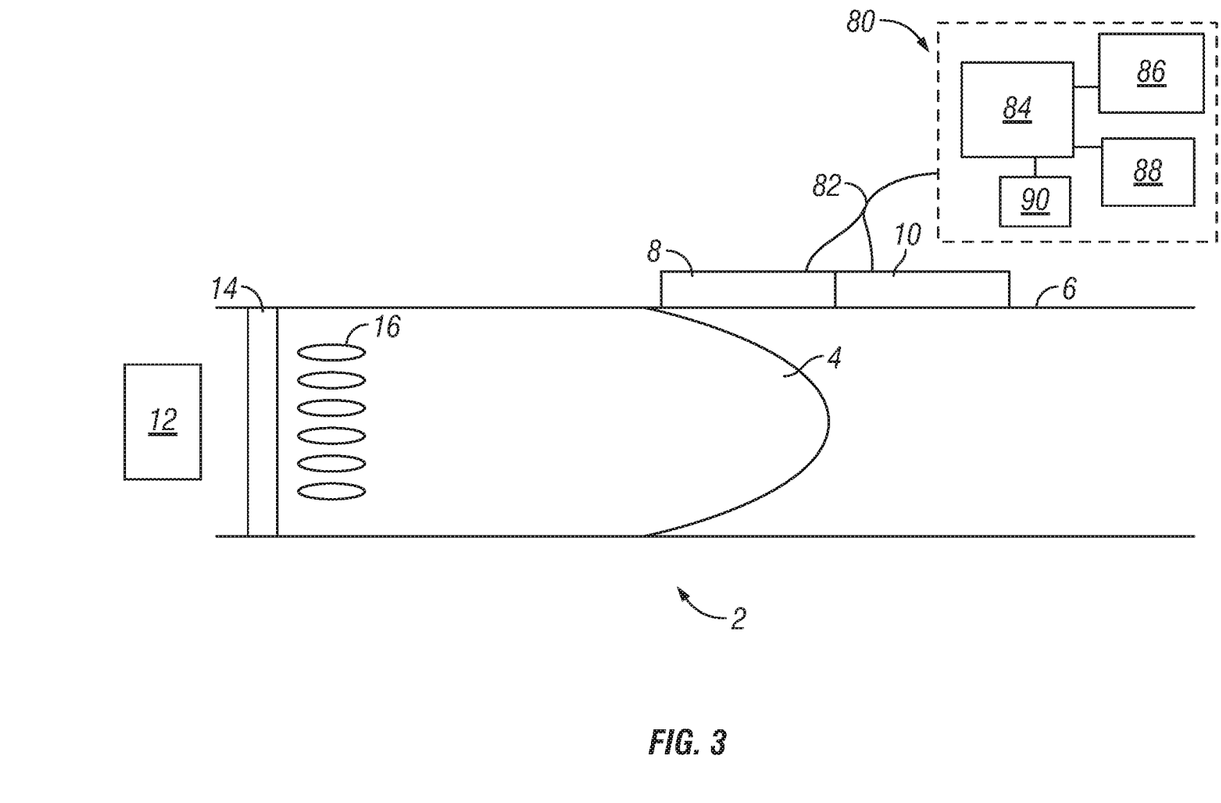
FIG. 3 is a schematic illustration of an example rheology measurement system with a transmitter and receiver disposed adjacent to each other.

As illustrated in FIG. 1-3, examples of rheology measurement systems 2 may be used to measure the rheology of fluid 4 within a conduit 6. The fluid may be a solid-containing fluid. Illustrated in FIG. 1, an ultrasound transmitter 8 and an ultrasound receiver 10 may be placed across from each other on opposing sides of conduit 6. Transmitter 8 and/or receiver 10 may be attached to an ultrasound imaging device and/or a Doppler ultrasound device. Transmitter 8 may be positioned to direct sound waves into the conduit 6. Transmitter 8 may produce a series of ultrasound pulses which may reflect, or echo, off fluid 4 within conduit 6. Ultrasound pulses may be reflected by fluid 4 in a variety of way and directions. These echoes may be received by receiver 10 which may send the information to an ultrasound imaging device which may produce a visual display of fluid 4 velocity through conduit 6. Taking measurements of fluid 4 in an active system may only require an ultrasound device with in-line measurements. When measuring rheology in an auxiliary system, an additional system may be required to take rheology measurements. While not illustrated on FIGS. 1-3, the rheology measurement system 2 may further include a control system that include one or more controllers that direct and regulate performance of the transmitter 8 and receiver 10. The control system may send signals to the transmitter 8 and/or receiver 10. The control system may also collect and process data from the receiver 10 to determine the velocity profile of the drilling fluid from which the rheology may be determined. The control system may also directly determine rheology.

A rheology measurement system 2 may comprise additional devices to prepare fluid 4 to be measured. For example, FIG. 1 further illustrates a system in which a pump 12, a heat exchanger 14 (e.g., a heater, a cooler, etc.) and/or vanes 16 may be used to prepare fluid 4 for measurement within conduit 6. A pump 12 may be fluidically coupled to the conduit 6 and used to move fluid 4 consistently through conduit 6, such as in an auxiliary system, for example. However, many pumps, such as piston pumps, may not allow fluid 4 to move through conduit 6 at a consistent velocity. Instead, the pumps may cause fluid 4 to pulsate through conduit 6, which may produce inaccurate and/or skewed readings. To prevent pulsating, a pump 12 may comprise one or more pumps which prevent and/or diminish pulsation of fluid 4. Examples of suitable pumps may include syringe pumps, peristaltic pumps, progressive cavity pumps, pulse dampened diaphragm pumps, which may prevent the pulsating of fluid 4 through conduit 6. Additionally, pump 12 may be connected to conduit 6 through a series of threaded connections. These connections may place pump 12 in-line within the auxiliary system and/or a separate branch off the auxiliary system.

To produce a steady velocity in fluid 4, the rheology measurement system may take advantage of the design of a heat exchanger 14. The heat exchanger 14 may be fluidically coupled to the pump 12 and/or the conduit 6. Fluid 4 may be heated and/or cooled, depending on the current location, use of fluid 4, and climate. For example, the fluid 4 may be at a temperature of 120° to 150° F. to meet API testing requirements. In examples, fluid 4 may have a high relative velocity, which may prevent transmitter 8 and/or receiver 10 from producing an accurate reading. This may be a direct result of warm climates and/or fluid 4 excess heat stored within fluid 4 caused by mechanical operations using fluid 4. In such examples, fluid 4 may be cooled by heat exchanger 14 to slow the velocity of fluid 4. A suitable heat exchanger 14 for cooling the fluid 4 may comprise peltier devices, resistance band heaters, resistance cartridge heaters, and/or resistance heat trace lines. At times fluid 4 may have a relatively low velocity that may prevent transmitter 8 and/or receiver 10 from producing an accurate reading. This may be caused by a colder climate and/or stagnated fluid 4. The heat exchanger 14 may be used to heat fluid 4 to increase the velocity of fluid 4. A suitable heat exchanger 14 for heating the fluid 4 may comprise a shell and tube type, plate and frame type, cross-flow type, banked tube, etc.

In some systems, as fluid 4 passes through conduit 6, fluid 4 may tend toward a turbulent flow regime. One or more flow straightening devices may be installed in conduit 6 to restrain the flow of the fluid 4 within the conduit 6 and/or to reduce the tendency toward turbulent flow and encourage laminar flow. By way of example, a plurality of vanes 16 may be used to smooth out fluid 4 and/or direct fluid 4 through conduit 6. The vanes 16 may disposed in the conduit 6 and extend along the longitudinal axis of the conduit 6 to minimize lateral velocity components in the fluid 4 as it passes through conduit 6. Within conduit 6, vanes 16 may comprise concentric circular fins and/or radial fins. In examples, there may be a plurality of vanes 16. There may be a range of vanes 16 from about one vane to about twelve vanes, from about four vanes to about eight vanes, from about six vanes to about eight vanes. Each vane 16 may be individually controlled and/or controlled as a set or group of vanes 16. This may allow an operator to direct fluid 4 in any manner in an effort to remove inconsistencies within fluid 4. Based on the system within which fluid 4 may be measured, a rheology measurement system 2 may be altered to accommodate any system forms and/or limitations.

In examples, as illustrated in FIGS. 2 and 3, the transmitter 8 and receiver 10 may be positioned in any manner that may be suitable to produce an accurate reading. As illustrated in FIG. 2, transmitter 8 and receiver 10 may be a single device 18 in which both the transmission of a signal and the receiving of the echo may be performed by the same unit, for example, an ultrasound transducer. In still other examples, as illustrated in FIG. 3, transmitter 8 and receiver 10 may be placed next to each other instead of across from each other, as illustrated in FIG. 1. The ability to use multiple locations for transmitters 8 and receivers 10 may allow for flexibility when performing rheology measurements of a fluid 4 within any system. Based on conditions and requirements, rheology measurement systems 2 may be altered as required to satisfy requirements specific to both in-line systems and auxiliary systems.

Transmitter 8 and receiver 10 may be coupled to a computer system 80 that may be coupled to transmitter 8 and receiver 10 by a control line 82. Computer system 80 may include a central processing unit 84, a monitor 86, an input device 88 (e.g., keyboard, mouse, etc.) as well as computer media 90 (e.g., optical disks, magnetic disks) that can store code representative of the above-described methods. Computer system 80 may be adapted to receive signals from transmitter 8 and receiver 10 representative of measurements taken by receiver 10 and signals produced by transmitter 8. Computer system 80 may act as a data acquisition system and possibly a data processing system that analyzes the measurements from receiver 10, for example, to derive rheology measurements, including a velocity profile, and track them over time. Measurements taken by receiver 10 may be transmitted to computer system 80, these measurements may represent the rheology of a fluid 4 within pipe 6. The rheology profile in turn may be indicative of the compositions within fluid 4 in pipe 6, enabling fluid 4 to be tracked, altered, and combined with other elements before being placed downhole. In this manner, receiver 10 measurements may be used to monitor the rheology of fluid 6.

Rheology measurement system 2 may be used in a variety of applications to measure the rheology of fluid 4 as it passes through conduit 6. As previously mentioned, the rheology measurement system 2 may be an in-line system or an auxiliary system. The rheology measurement system 2 may be particularly advantageous for measuring the rheology of drilling fluids (or other solids-containing fluids) in oilfield applications. By way of example, the rheology measurement system 2 may be used to measure, without limitation, drilling fluids, fracturing fluids, and completion fluids, among others. In general, the rheology measurement system 2 may use a series of ultrasound pulses and their echoed signal to determine the flow velocity. They can be processed to produce, for example, either a color flow display or a Doppler sonogram. The Doppler ultrasound may measure the movement of the scatters through the ultrasound signal as a phase change comparing to the received signal, which can be directly used for flow velocity calculation and thus, the viscosity calculation.

An example may include using the rheology measurement system 2 to monitor the rheology of a drilling fluid. There are various types of liquid-based drilling fluids: (1) water-based muds (WBM), which typically comprise a water-and-clay based composition, (2) oil-based muds (OBM), where the base fluid is a petroleum product, such as diesel fuel, and (3) synthetic-based muds (SBM), where the base fluid is a synthetic oil. In many cases, oil-based drilling fluids also have water or brine dispersed in the oil in significant proportions. For monitoring of the drilling fluid, the rheology measurement system 2 may be installed in-line at one or more locations in a drilling system, such as within the drilling mud circulating lines, the drilling pipe, etc. Among other things, the rheology measurement system 2 may be used to measure the rheology of the drilling fluid as well as evaluate solids separation efficiency. For example, the rheology measurement system 2 may be installed in the drill pipe to provide velocity and rheology property measurements of the drilling fluid in downhole conditions. Alternatively or in combination with an in-line installation, drilling fluid may be lined from one or more locations in the drilling system to a rheology measurement system 2 for analysis. In response to the rheology measurements, the formulation of the drilling fluid may be changed. For example, the oil-water ratio of the drilling fluid may be altered. In addition, the concentration of one or more drilling fluid additives, such as emulsifiers, wetting agents, rheology modifiers, weighting agents (e.g., barite), and filtration control additives, among others, may be altered in response to the rheology measurements.

Another example may include using the rheology measurement system 2 to monitor rheology of a fracturing fluid at one or more points in a well system. In hydraulic fracturing, a fracturing fluid may be introduced into a subterranean formation at or above the fracture pressure to create or enhance one or more fractures in the subterranean formation. The formulations of fracturing fluids may vary, but a typical fracturing fluid may include, without limitation, a linear gel, crosslinked gel, a nonviscosified water-based fluid, a gelled oil, a gelled acid, or a foamed fluid. Proppant (e.g., sand, ceramic materials) may be included in the fracturing fluid to keep the fractures open after treatment. For monitoring of the fracturing fluid, the rheology measurement system 2 comprising the transmitter 8 and receiver 10 may be placed inline at the surface and/or in the wellbore. Accordingly, the rheology of the fracturing fluid may be modeled at downhole conditions. This may be used to evaluate the fracturing fluid efficiency in terms of proppant transport, for example, to visualize the proppant motion in fracture and/or breaker efficiency for fracturing fluid cleanup. The formulation and concentration of a fracturing fluid may then be optimized.

Another example may include using the rheology measurement system 2 to evaluate friction reducer performance. Friction reducers may also be referred to as drag reducers and may be included in fracturing fluids. Common friction reducers may include synthetic polymers. Currently, friction reducers may be evaluated offsite in a laboratory. However, by installation of the rheology measurement system inline, color flow imaging ultrasound may be used for friction reducer evaluation on location to provide instant feedback on friction reducer performance. Accordingly, in response to rheology measurements, the concentration of the friction reducer in the fracturing fluid and/or the type of friction reducer used may be modified. Similarly, the rheology measurement system 2 may be used in multiphase flow and interstitial flows for boundary layer determination.

Another example may include using the rheology measurement system 2 at a mud plant for drilling fluid analysis.

By use of the rheology measurement system 2, the viscosity of the drilling fluid may be directly obtained from the Doppler ultrasound. In response to the rheology measurements, the formulation of the drilling fluid may be changed. For example, the oil-water ratio of the drilling fluid may be altered. In addition, the concentration of one or more drilling fluid additives, such as emulsifiers, wetting agents, rheology modifiers, weighting agents (e.g., barite), and filtration control additives, among others, may be altered in response to the rheology measurements. Alternatively or in addition to formula modification, the mixing procedure (e.g., shear rate) may be changed in response to the rheology measurements.

Another example may include using the rheology measurement system 2 in a mining operation. In a mining operation, a mining slurry may be produced, which may be waste stream or may be further processed to extract one or more desirable components. By use of the rheology measurement system 2, the components of the mining slurry as well as the solid concentration in the mining slurry may be determined.

Another example may include using the rheology measurement system 2 for evaluation of particle sedimentation, such as barite sag, in a treatment fluid. Barite sag may be particularly problematic in a drilling fluid where the weighting agent (e.g., barite, calcium carbonate, etc.) separation from the liquid phase. As a result of this particle sedimentation, the drilling fluid may exhibit significant density variations in the wellbore. To evaluate at wellbore conditions, the rheology measurement system 2 may be used at high temperature and high pressure. Similarly, the rheology measurement system 2 may also be used for determination of particle size distribution in a drilling fluid, particularly, when the drilling fluid returns from the wellbore. Such analysis may lead to the determination of cutting density and porosity, lost circulation material character, and lost circulation material efficiency.

Another example may include using the rheology measurement system 2 to build a database for simulation and modeling. For example, the rheology between the drilling fluid entering and exiting the wellbore may be related to drilling bit performance. Accordingly, the data obtained using the rheology measurement system 2 may be used to predict a number of drilling characteristics, including rate of penetration.

Figure 4:
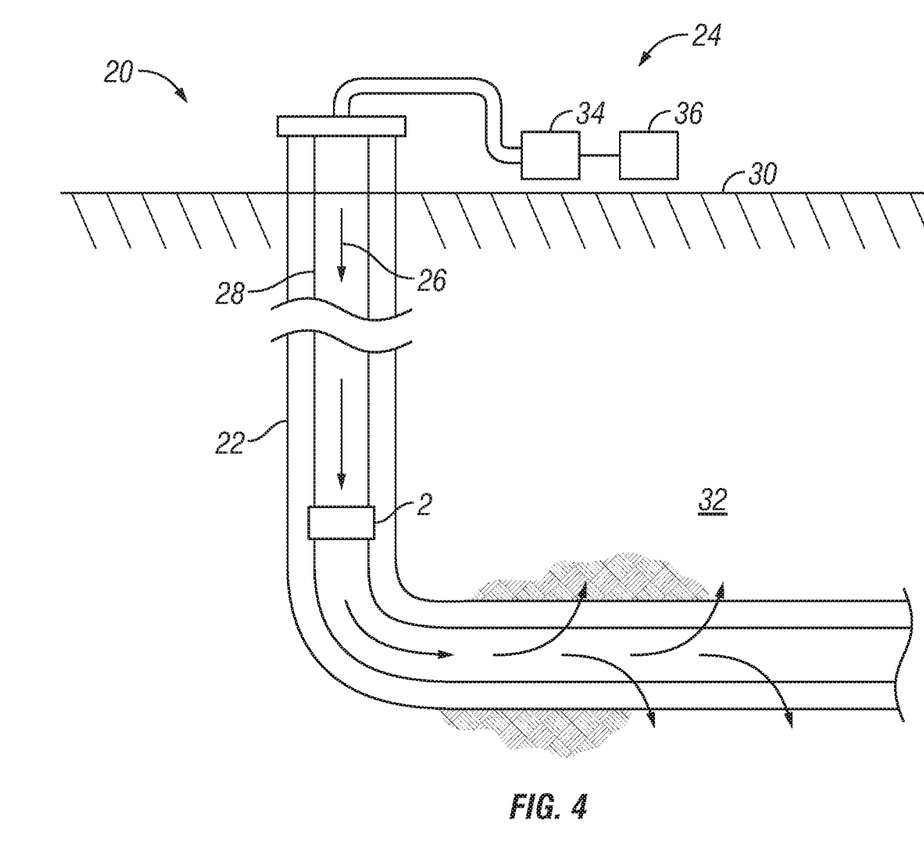
FIG. 4 is a schematic illustration of a well system.

FIG. 4 illustrates a well system 20 which may a rheology measurement system 2. As illustrated, the rheology measurement system 2 may be an in-line system. A well system 20, depicted in FIG. 4, may be used to introduce treatment fluids (e.g., fracturing fluids) into a wellbore 22. As illustrated in FIG. 4, well system 20 may include a fluid handling system 24 for introducing treatment fluids 26 into wellbore 22 by way of tubular 28. In the illustrated embodiment, fluid handling system 24 is above surface 30 while wellbore 22 and tubular 28 are below surface 30. Fluid handling system 24 may be configured as shown in FIG. 4 or in a different manner, and may include additional or different features as appropriate. Fluid handling system 24 may be deployed via skid equipment, marine vessel deployed, or may be comprised of sub-sea deployed equipment.

As illustrated in FIG. 4, wellbore 22 may include vertical and horizontal sections and a treatment fluid 26 may be introduced into subterranean formation 32 surrounding the horizontal portion of wellbore 22. Generally, a wellbore 22 may include horizontal, vertical, slant, curved, and other types of wellbore geometries and orientations, and treatment fluid 26 may generally be applied to subterranean formation 32 surrounding any portion of wellbore 22. Wellbore 22 may include a casing that is cemented or otherwise secured to the wellbore wall. Wellbore 22 may be uncased or include uncased sections. Perforations may be formed in the casing to allow treatment fluids 26 and/or other materials to flow into subterranean formation 32. Perforations may be formed using shape charges, a perforating gun, and/or other tools.

Fluid handling system 24 may include mobile vehicles, mobile installations, skids, hoses, tubes, fluid tanks or reservoir, pumps, valves, and/or other suitable structures and equipment. For example, fluid handling system 24 may include pumping equipment 34 and a fluid supply 36, which both may be in fluid communication with tubular 28. Fluid supply 36 may contain treatment fluid 26. Pumping equipment 34 may be used to supply treatment fluid 26 from fluid supply 36, which may include tank, reservoir, connections to external fluid supplies, and/or other suitable structures and equipment. Pumping equipment 34 may be coupled to tubular 28 to communicate treatment fluid 26 into wellbore 22. Fluid handling system 24 may also include surface and down-hole sensors (not shown) to measure pressure, rate, temperature and/or other parameters of treatment. Fluid handling system 24 may include pump controls and/or other types of controls for starting, stopping and/or otherwise controlling pumping as well as controls for selecting and/or otherwise controlling fluids pumped during the injection treatment. An injection control system may communicate with such equipment to monitor and control the injection treatment.

Tubular 28 may include coiled tubing, section pipe, and/or other structure that communicate fluid through wellbore 22. Alternatively, tubular 28 may include casing, liners, or other tubular structures disposed in wellbore 22. Tubular 28 may include flow control devices, bypass valves, ports, and/or other tools or well devices that control a flow of fluid from the interior of tubular 28 into subterranean formation 32. For example, tubular 28 may include ports to communicate treatment fluid 36 directly into the rock matrix of the subterranean formation 32. Although FIG. 4 illustrates the horizontal section of tubular 28 within inner tubular structure of well system 20, in some embodiments, such inner tubular structure may be absent.

With continued reference to FIG. 4, well system 20 may be used for delivery of treatment fluid 26 into wellbore 22. Treatment fluid 26 may be pumped from fluid supply 36 down the interior of tubular 28 in wellbore 22. Treatment fluid 26 may be allowed to flow down the interior of tubular 28, exit tubular 28, and finally enter subterranean formation 32 surrounding wellbore 22. Treatment fluid 26 may also enter subterranean formation 32 at a sufficient pressure to cause fracturing of subterranean formation 32.

As illustrated, the well system 20 may include a rheology measurement system 2. While the rheology measurement system 2 is illustrated below the surface 30, it is contemplated that one or more rheology measurement systems may be located above the surface 30 in place of in addition to the rheology measurement system 2. The rheology measurement system 2 may be used to measure the rheology of the treatment fluid 26 as it is being pumped into the subterranean formation 32. By placement below the surface 30, the rheology measurement system 2 may be used to monitor the rheology of the treatment fluid 26 at downhole conditions.

Figure 5:
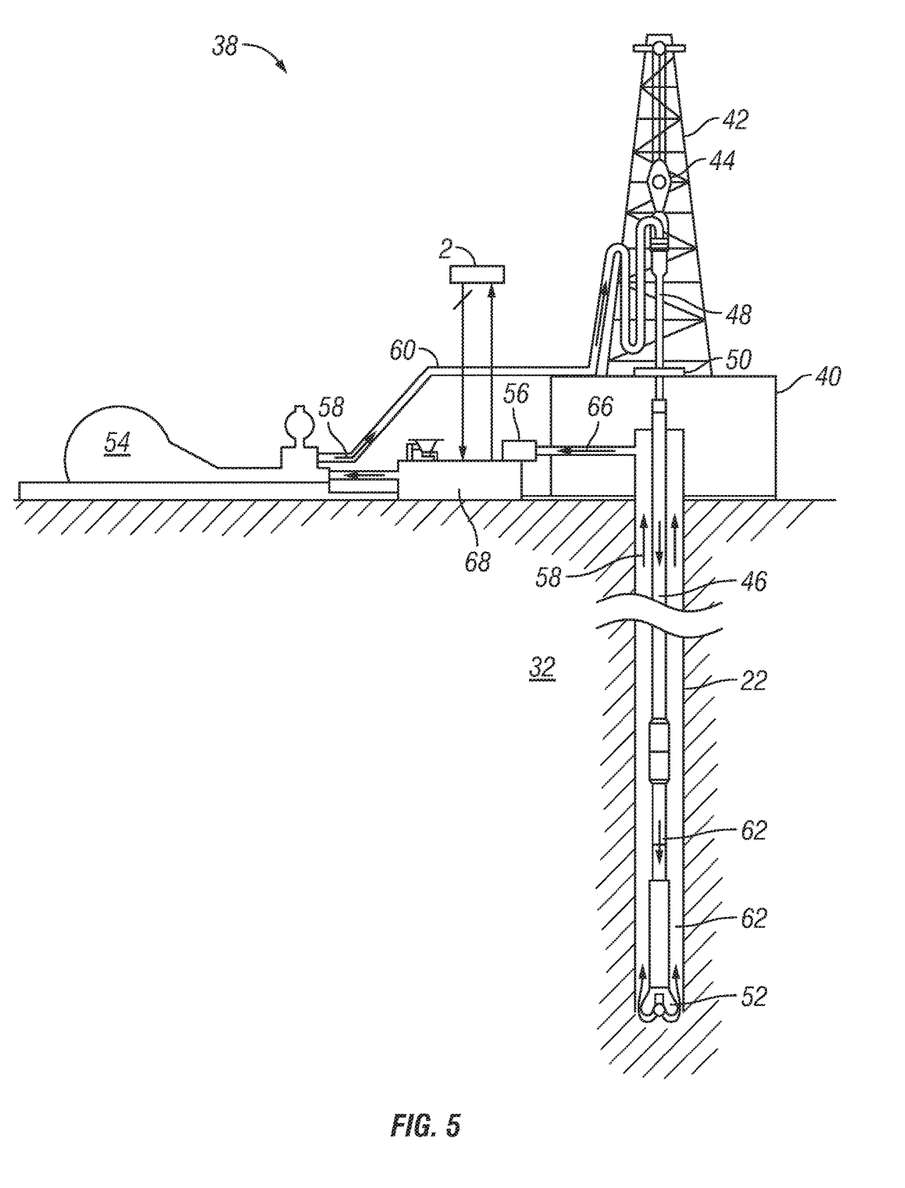
FIG. 5 is a schematic illustration of an example drilling system.

Referring now to FIG. 5, a drilling system 38 is illustrated that may use a rheology measurement system 2. As illustrated, the rheology measurement system 2 may be an auxiliary system that draws a sample of the drilling fluid for analysis. It should be noted that while FIG. 5 generally depicts a land-based drilling system, those skilled in the art will readily recognize that the principles describe herein are equally applicable to subsea drilling operations that employ floating or sea-based platforms and rigs, without departing form the scope of the disclosure.

As illustrated, drilling system 38 may include a drilling platform 40 that supports a derrick 42 having a traveling block 44 for raising and lowering a drill string 40. Drill string 46 may include, but is not limited to, drill pipe and coil tubing, as generally known to those skilled in the art. A kelly 48 may support drill string 46 as it may be lowered through a rotary table 50. A drill bit 52 may be attached to the distal end of drill sting 46 and may be driven either by a downhole motor and/or via rotation of drill string 46 form the well surface. Without limitation, drill bit 52 may include, roller cone bits, PDC bits, natural diamond bits, any hole openers, reamers, coring bits, and the like. As drill bit 52 rotates, it may create a wellbore 22 that penetrate various subterranean formations 32.

Drilling system 38 may further include a mud pump 54, one or more solids control system 56, and a retention pit 68. Mud pump 54 representatively may include any conduits, pipelines, trucks, tubulars, and/or pipes used to fluidically convey drilling fluid 58 downhole, any pumps, compressors, or motors (e.g., topside or downhole) used to drive the drilling fluid 58 into motion, any valves or related joints used to regulate the pressure or flow rate of drilling fluid 58, any sensors (e.g., pressure, temperature, flow rate, etc.), gauges, and/or combinations thereof, and the like.

Mud pump 54 may circulate drilling fluid 58 through a feed conduit 60 and to kelly 48, which may convey drilling fluid 58 downhole through the interior of drill string 46 and through one or more orifices in drill bit 52. Drilling fluid 58 may then be circulated back to surface 30 via an annulus 62 defined between drill string 46 and the walls of wellbore 22. At the surface, the recirculated or spent drilling fluid 58 may be exit the annulus 62 and may be conveyed to one or more solids control system 56 via an interconnecting flow line 66. The solids control system 56 may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, and/or any fluid reclamation equipment. The solids control system 56 may further include one or more sensors, gauges, pumps, compressors, and the like used store, monitor, regulate, and/or recondition the drilling fluid 58.

After passing through the solids control system 56, a "cleaned" drilling fluid 58 may be deposited into a nearby retention pit 68 (e.g., a mud pit). While illustrated as being arranged at the outlet of wellbore 22 via annulus 62, those skilled in the art will readily appreciate that the solids control system 56 may be arranged at any other location in drilling system 38 to facilitate its proper function, without departing from the scope of the disclosure. While FIG. 5 shows only a single retention pit 68, there could be more than one retention pit 68, such as multiple retention pits 68 in series. Moreover, the retention put 68 may be representative of one or more fluid storage facilities and/or units where the drilling fluid additives may be stored, reconditioned, and/or regulated until added to the drilling fluid 58.

As illustrated, the drilling system 38 may include a rheology measurement system 2. A fluid sample may be drawn at any desired point in the drilling system 38. As shown on FIG. 5, the fluid sample may be taken from the retention pit 68. It should be readily understood that fluid samples may be taken at one or more alternative/additional locations in the drilling system 38 without imparting form the intended scope of the present disclosure. The rheology measurement system 2 may be used to measure the rheology of the drilling fluid 58 as it is being circulated in the wellbore 22.

Figure 6:
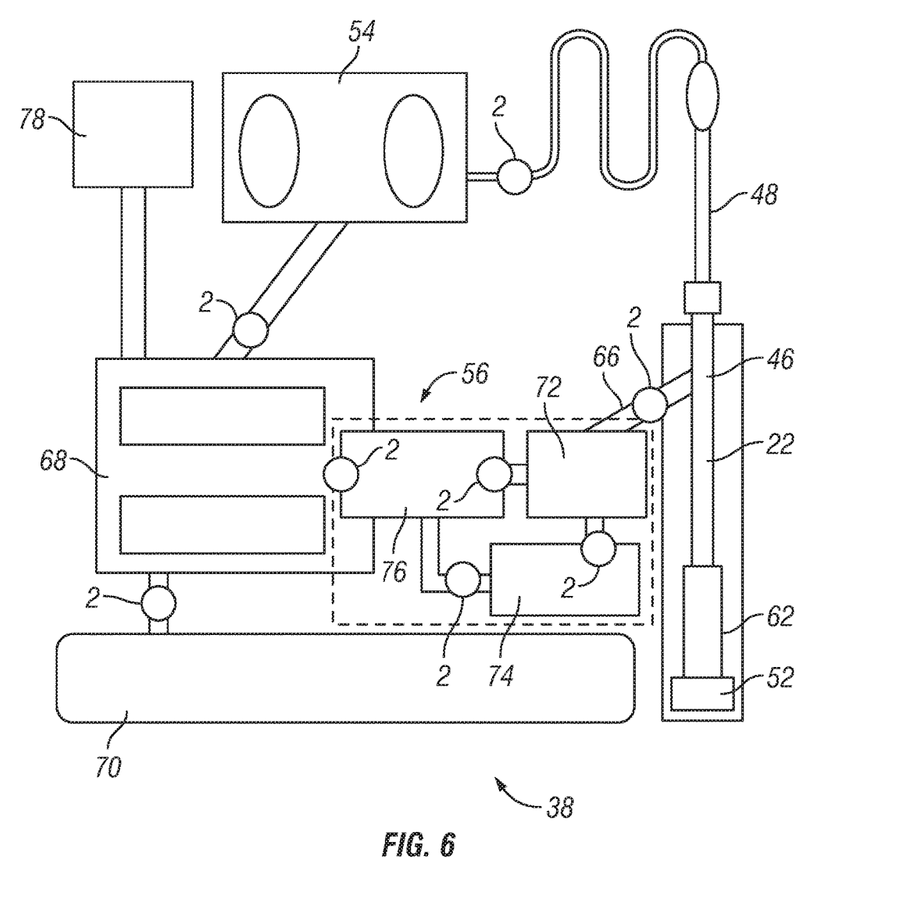
FIG. 6 is a schematic of an example drilling system with rheology measurement systems positioned within the drilling system.

While FIG. 5 illustrates, the rheology measurement system 2 as an auxiliary system, it is contemplated that one or more additional/alternative rheology measurement systems may be installed inline in the drilling system 38. Referring now to FIG. 6, an example is shown that include a rheology measurement system 2 disposed inline in a drilling system 38. As illustrated, rheology measurement system 2 may, for example, measure the rheology of drilling fluid 58 at any location on drilling system 38. FIG. 6 illustrates a schematic of drilling system 38, showing multiple positions of rheology measurement system 2. Drilling system 38, within the schematic, comprises drill string 46, kelly 48, drill bit 52, mud pump 54, solids control system 56, annulus 62, wellbore 22, flowline 66, retention pit 68, reserve pit 70, and mud mixing hopper 78. Solids control system 56 may further comprise a shale shaker 72, cones 74, and a centrifuge 76. As an in-line measurement system, rheology measurement system 2 may provide real time data about the rheology of drilling fluid 58 passing through different areas in drilling system 38. In examples, multiple rheology measurement systems 2 may be used to provide the operator with information in regard to the rheology of drilling fluid 58 at different areas of drilling system 38. For example, drilling system 38 may have a range of rheology measurement systems 2, which may comprise about one to about eight measurement systems, about three to about six measurement systems, and/or about two to about four measurement systems.

In examples, an operator may want to know the rheology of the drilling fluid 58 moving through different areas of drilling system 38. As discussed above, there may be a plurality of rheology measurement system 2 within drilling system 38. As illustrated in FIG. 6, a rheology measurement system 2 may be placed between reserve pit 70 and retention pit 68, between retention pit 68 and mud pump 54, and between mud pump 54 and kelly 48. Placement of rheology measurement systems 2 in these areas may provide information in regards to the drilling fluid 58 before it is sent downhole. Additionally a rheology measurement system 2 may be placed within flow line 66 before solids control system 56 and between solids control system 56 and retention pit 68. This may allow information to be gathered about the rheology of the drilling fluid 58 as it returns from the wellbore 22 and to identify if the rheology of the drilling fluid 58, as "cleaned" by solids control system 56, is acceptable to be placed within retention pit 68. To monitor the rheology of the drilling fluid 58 as it is "cleaned," rheology measurement systems 2 may be placed between shale shaker 72 and cones 74, between cones 74 and centrifuge 76, and between shale shaker 72 and centrifuge 76. Placement of rheology measurements systems 2 may also be found between mud mixing hopper 78 and retention pits 68. In FIG. 6, rheology measurement systems 2 are in-line measurements. In examples, measurements may be taken in the same area as illustrated in FIG. 6 but performed in an auxiliary system, as show in FIG. 5. Additionally, both in-line measurement systems and auxiliary systems may be used within the same drilling system 38. In-line measurement systems and auxiliary systems may be interchangeable and/or adaptable to the present conditions.

The preceding description provides various embodiments of the systems and methods of use disclosed herein which may contain different method steps and alternative combinations of components. It should be understood that, although individual embodiments may be discussed herein, the present disclosure covers all combinations of the disclosed embodiments, including, without limitation, the different component combinations, method step combinations, and properties of the system. It should be understood that the compositions and methods are described in terms of "comprising," "containing," or "including" various components or steps, the compositions and methods can also "consist essentially of" or "consist" of the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, and may be modified and practiced in different but equivalent manners apparent to those skilled in the art having the benefit of the teachings herein. Although individual embodiments are discussed, the disclosure covers all combinations of all of the embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of those embodiments. If there is any conflict in the usages of a word or term in this specification and one or more patent(s) or other documents that may be incorporated herein by reference, the definitions that are consistent with this specification should be adopted.

What is claimed is:

1. A system for rheology measurements comprising:
   a conduit;
   an ultrasound transmitter positioned to direct ultrasound pulses into the conduit;
   an ultrasound receiver positioned to receive sound waves from the conduit;
   a pump fluidically coupled to the conduit;
   a heat exchanger fluidically coupled to the conduit; and
   a flow straightening device disposed in the conduit.

2. A system according to claim 1, wherein the ultrasound transmitter and the ultrasound receiver are a single element.

3. A system according to claim 1, wherein the ultrasound transmitter and the ultrasound receiver are disposed on opposite sides of the conduit.

4. A system according to claim 1, wherein the ultrasound transmitter and the ultrasound receiver are disposed on the same side of the conduit.

5. A system according to claim 1, wherein the pump is a pulse dampened diaphragm pump.

6. A system according to claim 1, wherein the heat exchanger is a peltier device.

7. A system according to claim 1, wherein the flow straightening device comprises a plurality of vanes disposed in the conduit.

8. A system for rheology measurements comprising:
   a conduit;
   an ultrasound transmitter positioned to direct sound waves into the conduit;
   an ultrasound receiver on an opposite side of the conduit from the ultrasound transmitter and positioned to receive sound waves from the conduit;
   a pump fluidically coupled to the conduit;
   a heat exchanger fluidically coupled to the conduit; and
   vanes disposed in the conduit.

9. A system according to claim 8, wherein the heat exchanger is a resistance band heater.

10. A method of operating a rheology measurement system comprising:
    drawing a sample of a treatment fluid into the rheology measurement system;
    pressuring the sample of the treatment fluid;
    adjusting temperature of the treatment fluid;
    directing ultrasound pulses into the treatment fluid while the treatment fluid is flowing through the rheology measurement system;
    measuring sound waves reflected by the treatment fluid; and
    determining a velocity profile of the treatment fluid based at least on the measured sound waves.

11. A method according to claim 10, wherein the treatment fluid comprises a solids-containing fluid.

12. A method according to claim 10, wherein the step of adjusting the temperature comprises heating the treatment fluid.

13. A method according to claim 10, wherein the step of adjusting the temperature comprises cooling the treatment fluid.

14. A method according to claim 10, further comprising straightening flow of the treatment fluid in the rheology measurement system.

15. A method according to claim 14, wherein the straightening flow comprising passing the treatment fluid through a plurality of vanes positioned in a conduit in the rheology measurement system.

16. A method according to claim 10, further comprising generating a color flow display of fluid flow in the rheology measurement system.

17. A method according to claim 10, further comprising generating a Doppler sonogram of fluid flow in the rheology measurement system.

18. A method according to claim 10, further comprising determining viscosity of the treatment fluid based at least on the determined velocity profile.

19. A method according to claim 10, further comprising adjusting concentration of one or more components of the treatment fluid based at least on the velocity profile and/or rheology of the treatment fluid.

* * * * *